US008332894B2

(12) United States Patent
Toebes et al.

(10) Patent No.: US 8,332,894 B2
(45) Date of Patent: Dec. 11, 2012

(54) NOTIFYING USER OF MISSING EVENTS TO PREVENT VIEWING OF OUT-OF-SEQUENCE MEDIA SERIES EVENTS

(75) Inventors: John Toebes, Cary, NC (US); Philip Clifford Jacobs, Windham, NH (US); Guido Jouret, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 669 days.

(21) Appl. No.: 12/358,561

(22) Filed: Jan. 23, 2009

(65) Prior Publication Data
US 2010/0192187 A1    Jul. 29, 2010

(51) Int. Cl.
G06F 13/00    (2006.01)
G06F 3/00    (2006.01)
H04N 5/445    (2011.01)

(52) U.S. Cl. ............ 725/58; 725/44; 725/46; 725/87

(58) Field of Classification Search ........... 725/44, 725/46, 58, 87
See application file for complete search history.

(56) References Cited

U.S. PATENT DOCUMENTS

| 2007/0154163 | A1* | 7/2007 | Cordray | 386/52 |
| 2007/0157249 | A1* | 7/2007 | Cordray et al. | 725/58 |
| 2008/0065693 | A1* | 3/2008 | Malik | 707/104.1 |

OTHER PUBLICATIONS

U.S. Appl. No. 11/947,298, filed Nov. 29, 2007, Toebes et al.
U.S. Appl. No. 12/181,136, filed Nov. 29, 2007, Davi et al.
Toebes, "Enabling a Richer Video Experience With Metadata", [online], W3C Video on the Web Workshop Dec. 12-13, 2007, [retrieved on Apr. 9, 2008]. Retrieved from the Internet<URL: http://www.w3.org/2007/08/video/positions/Cisco_MSG.html>, pp. 1-4.
CPAN.org, "Parse TV.com for TV Series information", Jan. 5, 2008, [retrieved on Apr. 10, 2009]. Retrieved from the Internet: <URL: http://web.archive.org/web/20080105050706/http://search.cpan.org~tigris/WWW-TV-0.08/lib/WWW/TV/Series.pm>, pp. 1-4.
Gossamer-threads.com, "Myth Video Organization", Aug. 30, 2007, [retrieved on Apr. 10, 2009]. Retrieved from the Internet: <URL: http://gossamer-threads.com/lists/mythtv/users/286432>, pp. 1-9.

* cited by examiner

*Primary Examiner* — Pankaj Kumar
*Assistant Examiner* — Mulugeta Mengesha
(74) *Attorney, Agent, or Firm* — Leon R. Turkevich

(57) ABSTRACT

In one embodiment, a method comprises detecting that a user has requested presentation of a media content item from a media series having a prescribed sequence of media series events, the media content item containing a subsequent media series event from the media series; determining that the user has not consumed an antecedent media series event, the antecedent media series event not in the media content item and preceding the subsequent media series event in the prescribed sequence of media series events; and sending a message notifying the user that the user has not consumed at least the antecedent media series event, enabling the user to defer presentation of the media content item and consume the antecedent media series event.

20 Claims, 6 Drawing Sheets

Sequence of Media Content Items for Media Series "X", 62 — 48

Sequence of Events for Media Series "X", 64 — 32

60

58

| Media Content Item ID | Show and Episode | Event(s) | Storyline(s) |
|---|---|---|---|
| C1 | A1 | XA11, XA12 | S1, S2 |
| C2 | A1 | XA13 | S2 |
| C3 | B1 | XB11 | S3 |
| C4 | B1 | XB12, XB13 | S3, S4 |
| C5 | A2 | XA21 | S1 |
| C6 | A2 | XA22 | S2 |
| C7 | A2 | XA23 | S5 |
| C8 | B2 | XB21, XB22 | S3, S4 |
| C9 | B2 | XB23 | S3, S4 |
| C10 | A3 | XA31, XA32 | S1, S2, S5 |
| C11 | A3 | XA33 | S4, S5 |
| C12 | B3 | XB31, XB32 | S3, S4 |
| C13 | B3 | XB33 | S4, S5 |

Media Series "X" Metadata, 50

Figure 3

NOTIFYING USER OF MISSING EVENTS TO PREVENT VIEWING OF OUT-OF-SEQUENCE MEDIA SERIES EVENTS

TECHNICAL FIELD

The present disclosure generally relates to presenting media content items (e.g., digital images, digital audio files, or digital video files) to a user, where the media content items are arranged according to a prescribed sequence as part of a media series (e.g., a podcast series, a television broadcast series, a series of movies, etc.).

BACKGROUND

A television show can be presented as a series of television episodes that are broadcast to television viewers at regularly scheduled intervals. A producer of a television show typically will produce one or more storylines that are presented over the course of multiple television episodes, where a given episode can present one or more significant events for at least one of the storylines. Hence, the presentation of storylines over multiple episodes enables the producer to maximize the attraction of the television series (and thereby optimize revenue generation) by encouraging audiences to continue watching all of the television episodes as they are initially broadcast, maximizing the attraction of the television series to optimize revenue generation. Such storylines also can be presented over multiple episodes using different media, for example radio, podcasting, etc.

The distribution of episodes for a given media series (e.g., a television series) can be controlled by the producer during the initial release of an episode to the appropriate distribution medium (e.g., live television, live radio, new DVD release, initial release via the Internet, etc.). However, users can record the episodes as they are released for later viewing (e.g., using a digital video recorder such as a set-top box); users of the Internet also can locate multiple sources of the episodes after their initial release. Hence, after initial release a producer no longer has control of the sequence in which the episodes can be viewed by a user. Consequently, the user encounters the risk of watching an episode out of sequence. Watching an episode out of sequence reduces the value of a previous episode or a subsequent episode due to the user having missed events from a previous episode (resulting in user confusion of events in the out-of-sequence episode). The out-of-sequence episode also can present "spoilers", namely an unexpected event to a storyline that has not yet been adequately developed because the user had missed events in the previous episode.

BRIEF DESCRIPTION OF THE DRAWINGS

Reference is made to the attached drawings, wherein elements having the same reference numeral designations represent like elements throughout and wherein:

FIG. 3 illustrates an example data structure stored in the system of FIG. 1 and storing media series metadata describing the media series of FIG. 2, according to an example embodiment.

DESCRIPTION OF EXAMPLE EMBODIMENTS

Overview

Figure 1:
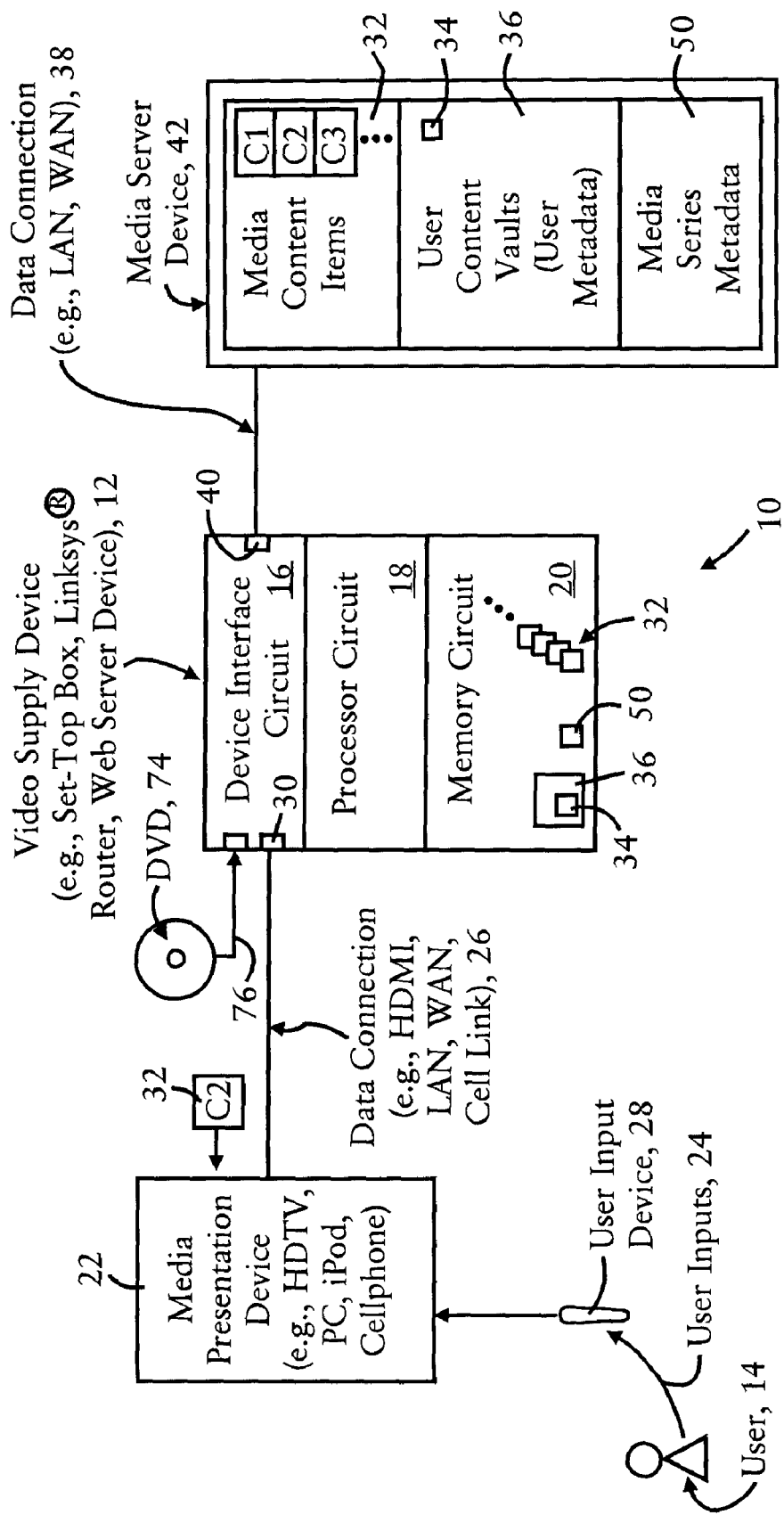
FIG. 1 illustrates an example system having an apparatus configured for notifying a user of an antecedent media series event, enabling the user to defer presentation of a media content item requested by the user in order to consume the antecedent media series event according to a prescribed sequence of media series events, according to an example embodiment.

In one embodiment, a method comprises detecting that a user has requested presentation of a media content item from a media series having a prescribed sequence of media series events, the media content item containing a subsequent media series event from the media series; determining that the user has not consumed an antecedent media series event, the antecedent media series event not in the media content item and preceding the subsequent media series event in the prescribed sequence of media series events; and sending a message notifying the user that the user has not consumed at least the antecedent media series event; the message enabling the user to defer presentation of the media content item containing the subsequent media series event and consume the antecedent media series event according to the prescribed sequence of media series events.

In another embodiment, an apparatus comprises a device interface circuit and a processor circuit. The device interface circuit is configured for detecting inputs by a user and data supplied to a media presentation device in use by the user. The processor circuit is configured for detecting, via the device interface circuit, that the user has requested presentation of a media content item from a media series having a prescribed sequence of media series events, the media content item containing a subsequent media series event from the media series. The processor circuit further is configured for determining, based on the tangible machine-readable data structure, that the user has not consumed an antecedent media series event, the antecedent media series event not in the media content item and preceding the subsequent media series event in the prescribed sequence of media series events. The processor circuit further is configured for sending, via the device interface circuit, a message notifying the user that the user has not consumed at least the antecedent media series event. The message enables the user to defer presentation of the media content item containing the subsequent media series event and consume the antecedent media series event according to the prescribed sequence of media series events.

DETAILED DESCRIPTION

Particular embodiments can track a user consuming media series events from a media series, for example a television series, a podcast series, etc., and/or the user consuming media content items containing one or more media series events. The particular embodiments can track the user consuming media series events based on storing at least one user activity entry that indicates the media series events of a media series that have been consumed by the user. The particular embodiments can indicate the media series events consumed by the user by specifying, in the user activity entry, media series event identifiers identifying the respective media series events consumed, and/or media content item identifiers identifying the media content items consumed by the user and containing the media series events consumed.

The term "media content item" as used herein refers to a data structure that can be stored onto a tangible machine-readable storage medium and transmitted to another machine via a transmission medium. The media content item is encoded with media data such as audio data, video data, and/or image data. The media content item also can include metadata that describes the subject matter that is presented during decoding of the media data during presentation by a media presentation device. Example metadata describing the subject matter presented by the media data can include an event identifier that identifies and/or describes a media series event that is presented to the user during the decoding of the media data. An example media series event can be an action scene, a significant scene of the plot or storyline presented by the media series, etc. Alternately, the metadata in the media content item can include a timestamp at regular time intervals, where one or more media series events within a media content item can be identified from a second metadata file (local or remote) that associates an identifiable media series event with a specific timestamp of the media content item. Alternately, the metadata in the media content item can include an identifier that enables retrieval of metadata from a remote destination (i.e., reachable via a wide area network) and that describes the media content item and/or one or more media series events presented in the media content item.

Hence, a media series producer can define a media series as a prescribed sequence of media series events that are encoded into media data within one or more media content items. Production of the media series also can involve dividing the prescribed sequence of media series events into prescribed segments referred to as "episodes", where each episode can be implemented as a single media content item, or multiple media content items. The segmentation of the media series can be described by media series metadata. The media series metadata can describe the media series in terms of the number of related media shows that should be associated with the media series, the number of episodes to be established for a each media show, the number of media content items that should be used for implementing a given episode, and finally the number of media series events that are to be stored within a given media content item.

The particular embodiments also can identify the prescribed sequence of media series events that have been established for the media series. In response to detecting that the user has requested presentation of a media content item containing a subsequent media series event from the media series, the particular embodiments can compare the user activity entry with the media series metadata to determine whether the user has consumed all the media series events preceding the subsequent media series event, or whether the user has not consumed an antecedent media series event that is in the prescribed sequence of media series events but not in the media content item requested by the user. Hence, the particular embodiments can send a message notifying the user of the antecedent media series event that has not been consumed by the user (i.e., that has been missed by the user). The message enables the user to prevent viewing the subsequent media series event (i.e., the out-of-sequence media series event) by deferring presentation of the media content item containing the subsequent media series event. The user also can request the media content item containing the antecedent media series event in order to consume the antecedent media series event according to the prescribed sequence of media series events established by the producer of the media series.

Consequently, the particular embodiments enable users to optimize their experience of the media series by permitting the users to ensure the media series events are presented in the prescribed sequence of media series events established by the media series producer, even if all of the media series events are available to the user.

Further, the particular embodiments enable the users to enhance their experience of the media series by viewing summary presentations of episodes containing the antecedent media series event, as opposed to forcing the user to watch an entire episode containing the antecedent media series event. In addition, the tracking of media series events from a media series can encompass multiple media shows and storylines, enabling the user to choose which media shows or storylines among the media shows should be followed according to the prescribed sequence of media series events established by the producer.

FIG. 1 illustrates an example 10 system having an apparatus 12 configured for notifying a user 14 of an antecedent media series event, according to an example embodiment. The apparatus 12 is a machine and includes a device interface circuit 16, a processor circuit 18, and a memory circuit 20. The apparatus 12, also referred to as a video supply device 12, can be implemented as a machine according to various implementations, depending on whether the apparatus 12 is implemented at a user premises (e.g., as a set-top box, a Linksys® router, etc.), within a service provider network (e.g., as a video on demand or pay-per-view server device), or within a wide-area network such as the Internet (e.g., as a web server device).

Regardless of implementation, the processor circuit 18 in the apparatus 12 is configured for tracking the user consuming (e.g., viewing or listening to) media series events that are presented to the user 14 via a media presentation device 22. The device interface circuit 16 includes a first interface circuit 30 configured for detecting user inputs 24 via a data connection 26 with the media presentation device 22 and/or a user input device 28. Depending on implementation of the media presentation device 22 and the apparatus 12, the data connection 26 can be implemented as a high-definition multimedia interface (HDMI) link, a wired or wireless local area network (LAN) data link (e.g., a IEEE 802.3 or IEEE 802.11 data link), a wide-area network connection (e.g., TCP/IP), or a combination of a wireless and wired connection between the device 22 and the apparatus 12. If the apparatus 12 is implemented as a set-top box, the first interface circuit 30 also can include an infrared interface for receiving the user inputs 24 via the user input device 28 (implemented, for example, as a remote control device). The media presentation device 22 can be implemented, for example, as a high definition television (HDTV), a personal computer, a cell phone, or a portable user device such as an MP3 player (MPEG-1 Audio Layer 3) or MP4 player (MP3 plus video and/or MPEG-4 Part 14).

The first interface circuit 30 also is configured for detecting data for a media content item 32 supplied to the media presentation device 22 for presentation to the user 14. For example, the first interface circuit 30 can directly supply the media content item (e.g., "C2") 32 to the media presentation device 22 via the data connection 26 as an encoded stream of data packets (e.g., streaming media); alternatively, the first interface circuit 30 can receive metadata from the media presentation device 22 via the data connection 26 if the media content item 32 is received by the media presentation device 22 via another source (e.g., another HDMI connection in the media presentation device 22). Hence, the processor circuit 18 in the apparatus 12 can be configured for detecting that the user 14 has consumed a prescribed media series event presented to the user 14 on the media presentation device 22 based on monitoring the supply of data packets (e.g., streaming media) for the media content item 32 to the media presentation device 22, or based on received metadata from the media presentation device 22 identifying the media series event consumed by the user 14.

The processor circuit 18 is configured for responding to the detection of the user having consumed the identifiable media series event based on storing at least one user activity entry 34 on a tangible machine-readable data structure 36, indicating that the user has consumed an identifiable media series event. As illustrated in FIG. 1, the processor circuit 18 can be configured for storing the data structure 36 containing the user activity entry 34 locally within the memory circuit 20, or in another storage device 42 that is reachable either locally or remotely via a data connection 38. The data connection 38 is established by a network interface circuit 40 within the device interface circuit 16. Depending on implementation of the apparatus 12, the network interface circuit 40 can be implemented as a cable modem configured for connection with a cable service provider, a digital subscriber line (DSL) modem, a wired or wireless local area network connection (e.g., 802.3 or 802.11), etc. As illustrated in FIG. 1, the user activity entry 34 can be stored within a device 42 that is remotely reachable via a wide-area network connection. The device 42 also can be implemented as a mass storage device (e.g., a network enabled hard disk drive) that is locally reachable by the network interface circuit 40 via a local area network connection. The data structure 36, also referred to as a "content vault", is described in further detail below with respect to FIG. 5.

Figure 5:
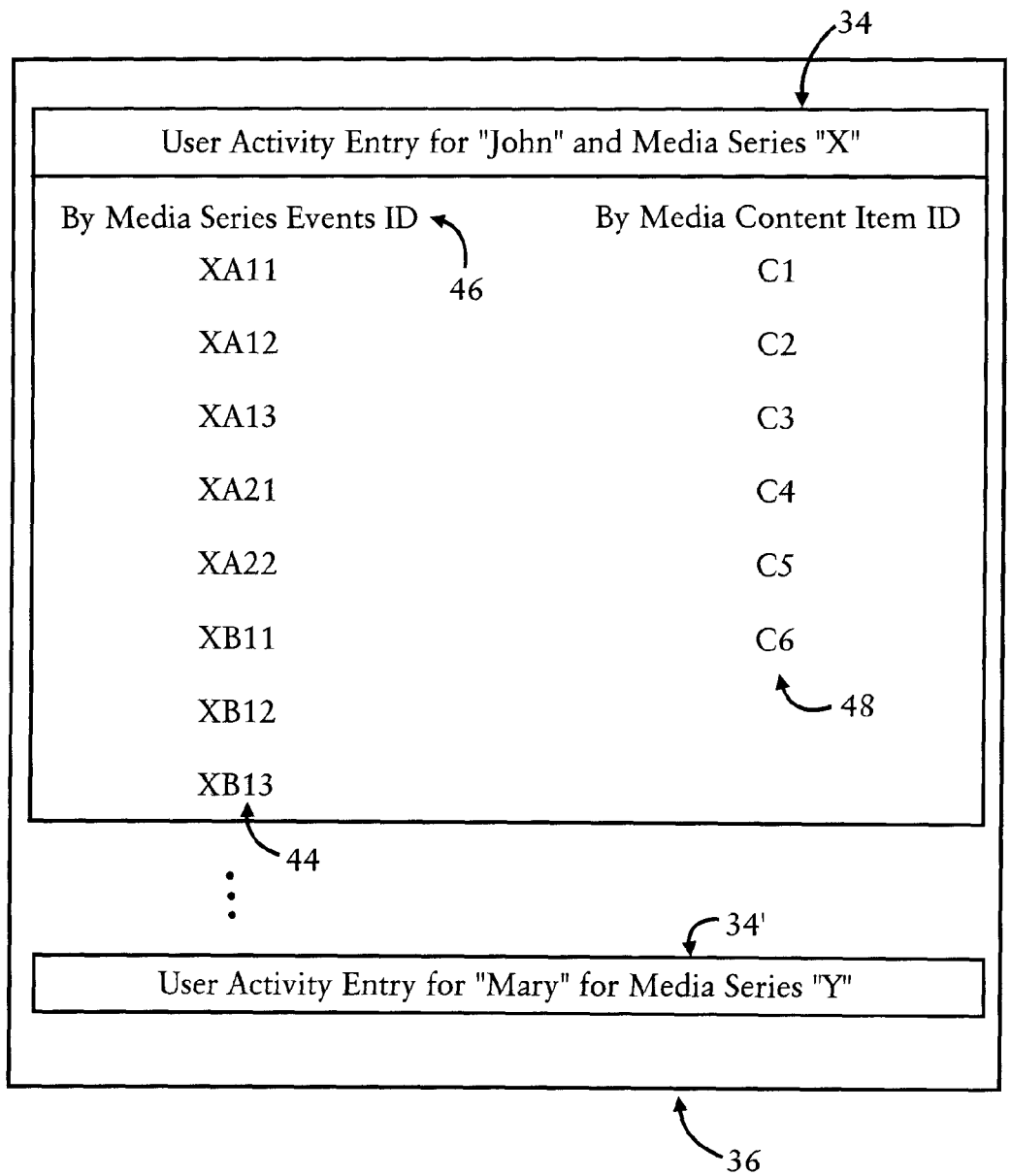
FIG. 5 illustrates a tangible machine-readable data structure generated by the apparatus of FIG. 1 and storing a user activity entry enabling identification of media series events consumed by a user, according to an example embodiment.

FIG. 5 illustrates an example data structure 36 containing at least one user activity entry 34, according to an example embodiment. The user activity entry 34 is configured for indicating one or more identifiable media series events 44 for a given media series "X" that have been consumed by a corresponding identified user (e.g., "John") 14. FIG. 5 illustrates that each media series event 44 can be represented by a corresponding media series event identifier 46, for example "XA11" for one media series event, "XA12" for another media series event, etc. Hence, the processor circuit 18 can store in the user activity 34 entry a media series event identifier 46 that explicitly identifies the corresponding media series event 44 having been consumed by the user 14.

FIG. 5 also illustrates that the user activity entry 34 can indicate the user 14 has consumed one or more identifiable media series events 44 based on specifying a media content item identifier 48 that uniquely identifies the corresponding media content item 32 containing the one or more identifiable media series events 44. Hence, the processor circuit 18 can detect that the user has consumed an identifiable media series event 44 based on detecting that the user has consumed the media content item 32 containing the media series event 44. As described below with respect to FIGS. 2 and 3, the processor circuit 18 can access media series metadata 50 (illustrated in FIGS. 1 and 3) to identify the one or more media series events 44 that are contained within the media content item 32. The processor circuit 18 also can identify if only a portion of the media series events 44 in a given media content item 32 have been consumed, for example if the user activity entry 34 includes timecode data for any partially completed media content items 32, and if the media series metadata 50 includes timecode data assigning each media series event 44 in the media content item to a corresponding timecode.

Hence, the user activity entry 34 can identify an identifiable media series event 44 consumed by the user 14, enabling the processor circuit 18 to track the media series events 44 consumed by the user 14. As described below, the user activity entry 34 can be used for comparison with the media series metadata 50 to determine whether the user is requesting presentation of the next contiguous media content item 32 containing the next contiguous media series event 44, or whether the user is requesting an out-of-sequence media content item 32 containing an out-of-sequence media series event 44 that follows after the next contiguous media series event 44.

Figure 2:
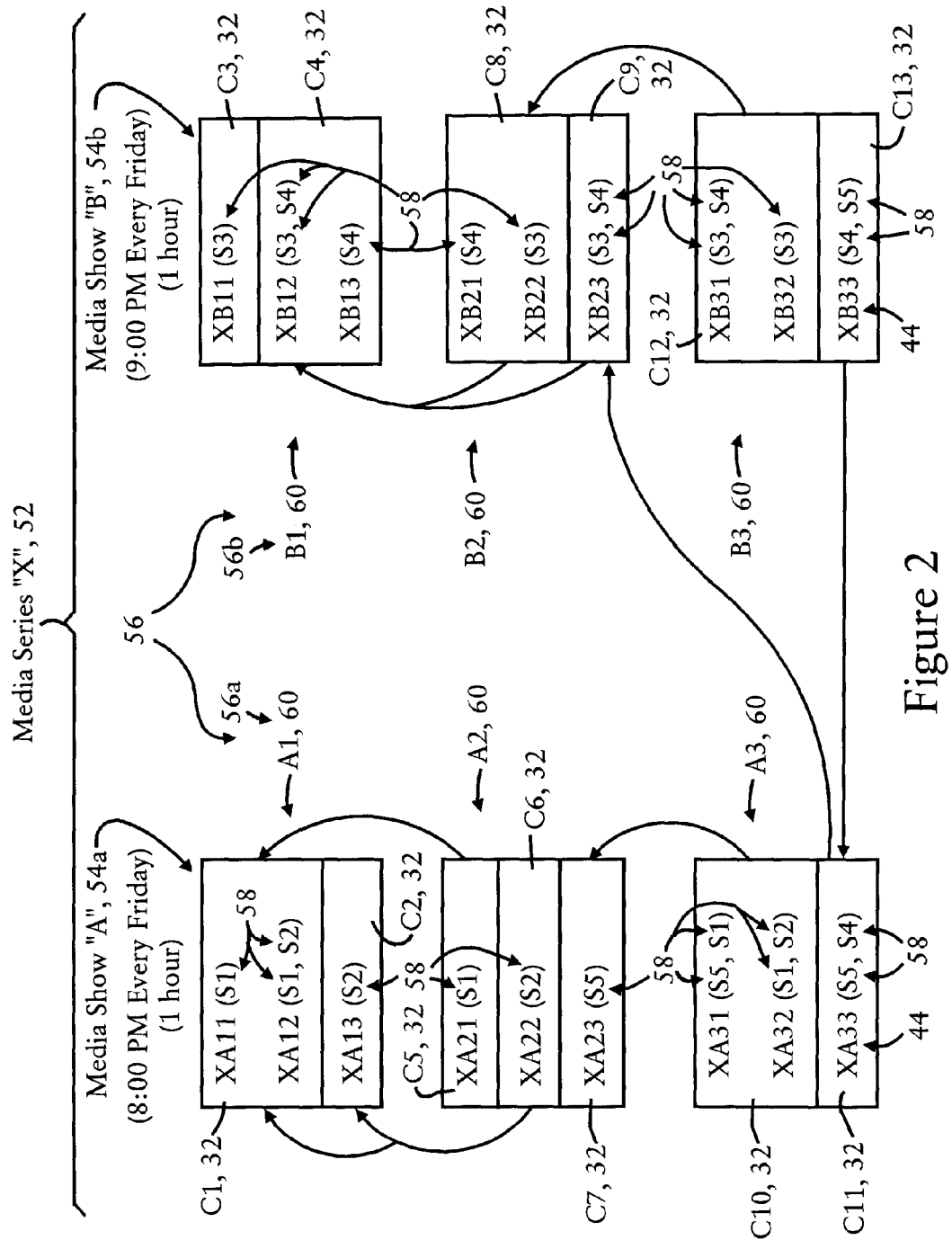
FIG. 2 illustrates an example media series having multiple media shows with respective prescribed sequences of episodes for presentation of multiple storylines, according to an example embodiment.

FIG. 2 illustrates an example media series 52, according to an example embodiment. FIG. 3 illustrates an example of the media series metadata 50 stored as a data structure on a tangible machine-readable storage medium such as the memory circuit 20 or the mass storage device 42 of FIG. 1. As illustrated in FIGS. 2 and 3, the media series "X" 52 can include one or more media shows 54a, 54b. Each media show 54a, 54b has a corresponding prescribed sequence 56 of episodes 60 for presentation of multiple storylines 58. Each episode 60 can be identified by an alphabetic character that specifies the relevant media show 54a or 54b, and a numeric character that specifies the relative position of the episode 60 within the prescribed sequence 56 of episodes: hence, the reference "A2" identifies the episode 60 as the second episode of the media show "A" 54a.

The first media show "A" 54a includes the prescribed sequence 56a of episodes "A1", A2", and "A3" 60. The second media show "B" 54b includes the prescribed sequence 56b of episodes "B1, B2", and "B3". Hence, the media series 52 includes a first prescribed sequence 56a of episodes 60 for the media show 54a and a second prescribed sequence 56b of episodes 60 for the media show 54b. As illustrated in FIG. 2, each episode 60 of the media show "A" 54a (e.g., "A1", "A2", "A3") is scheduled for initial presentation for one hour on a prescribed television channel at a prescribed repeating interval (e.g., 8:00 PM every Friday), followed by initial presentation on the same television channel of a corresponding episode 60 of the media show ""B" 54b (e.g., "B1", "B2", "B3"). Hence, the episodes 60 of the media shows 54a and 54b can be interleaved among each other, such that the media series 52 has the prescribed episode sequence of "A1, B1, A2, B2, A3, B3" for presentation of the prescribed sequence 64 of media series events, illustrated in the sequence of episodes 60 in FIG. 3.

As illustrated in FIGS. 2 and 3, each episode 60 is implemented based on presentation of one or more media content items 32, where the presentation of the episode "A1" 60 is based on the sequential presentation of the media content items "C1" and "C2" 32, the presentation of the episode "B1" 60 is based on the sequential presentation of the media content items "C3" and "C4", the presentation of the episode "A2" is based on the sequential presentation of the media content items "C5", "C6", and "C7", etc. As illustrated in FIGS. 2, 3 and 5, the media content item identifier (e.g., "C3") 48 specifies the position of the media content item 32 within the prescribed sequence 62 of media content items 32 for presentation of the media series events 44 according to the prescribed sequence 64 of media series events. Each media series event identifier 46 (e.g., "XA23") can identify the media show 54 that the corresponding media series event 44 is presented (e.g., "XAxx" presented in media show "A" 54a), the episode 60 that the corresponding media series event 44 is presented (e.g., "XA2x" presented in episode "A2" 60), and the relative contiguous sequence position of the corresponding media series event 44 relative to other media series events 44 in the same episode (e.g., "XA23" is in the third position following "XA21" and "XA22") (the lower-case character "x" indicates a "don't care" value). Hence, each media content item 32 contains one or more of the media series events 44 arranged in a contiguous sequence according to the prescribed sequence 64 for the media series 52. Further, the media series metadata 54 identifies each of the media series events 44 contained in each media content item 32.

Hence, the sequential presentation of the media content items 32 according to the prescribed sequence "C1, C2, C3, C4, . . . , C13" 62 for the media series "X" 52 results in the presentation of the media series events 44 according to the prescribed sequence 64 of media series events established for the media series 52. Hence, the interleaving of the sequences 56a and 56b of episodes results in the prescribed sequence 64 of media series events 44 being interleaved within the first prescribed sequence 56a of episodes and the second prescribed sequence 56b of episodes. Although not illustrated in FIG. 2 or 3, note that a media series event may be presented in more than one episode, for example as part of a summary review following the initial presentation, or as part of a "flashback" to the initial presentation.

As described below with respect to FIGS. 4A and 4B, the processor circuit 18 of FIG. 1 can identify the relative positions of media series events 44 and/or media content items 32 requested by the user 14, relative to those media series events 44 and/or media content items 48 already consumed by the user (as specified by the user activity entry 34 of FIG. 5) based on comparing the requested events 44 or items 32 relative to the user activity entry 34 and the media series metadata 50. Hence, the processor circuit 18 can determine whether the user has not consumed an antecedent media series event 44 (contained in an antecedent media content item 48) relative to a requested media series event 44 (or a requested media content item 48 containing the requested media series event 44).

Hence, the processor circuit 18 can notify the user 14 if the user has not consumed an antecedent media series event. For example, if the user 14 requests the media content item "C10" 32 (containing the media series events "XA31" and "XA32" 44) and the user activity entry 34 indicates the user 14 has not consumed the antecedent media series event "XA23" 44 contained in the media content item "C7" 32, the processor circuit 18 can send a message notifying the user 14 that the user has not consumed at least the antecedent media series event "XA23" 44. Note that the notification that the user has not consumed at least the antecedent media series event "XA23" 44 need not necessarily explicitly specify the media series event "XA23"; to the contrary, the notification can provide an indirect reference to the antecedent media series event "XA23" 44 in the form of a direct reference to the media content item "C7" 32 containing the antecedent media series event "XA23" 44, or an indirect reference to the media content item "C7" 32 (e.g., a message specifying "You Forgot to Watch the Last Segment of Episode 2: Would You like to Watch It Now?"). Hence, the processor circuit 18 can notify the user in order to enable the user to defer presentation of the media content item "C10" 32 that was initially requested (and containing the subsequent media series events "XA31" and "XA32" 44), and consume the antecedent media series event "XA23" 44 contained in the antecedent media content item "C7" 32, according to the prescribed sequence 64 of media series events.

FIGS. 2 and 3 further illustrate that each episode 60 can include one or more storylines 58. Each storyline 58, illustrated by a corresponding identifier (e.g., S1, S2, S3, S4, or S5) can represent a prescribed theme, plot line, or character that is presented across multiple media series events 44 of the media series 52. In particular, each media series event 44 is assigned to at least one of the storylines 58, resulting in presentation of a given storyline based on the successive presentation of assigned media series events 44 according to a prescribed storyline sequence.

For example, the storyline "S1" 58 represents one example storyline that is presented exclusively in the media show 54a based on the successive presentation of media series events "XA11", "XA12", XA21", "XA31", and "XA32" 44. The storyline "S2" 58 represents another example storyline that is presented exclusively in the media show 54a based on the successive presentation of media series events "XA12", "XA13", "XA22", and "XA32" 44. The storyline "S3" 58 represents another example storyline that is presented exclusively in the media show 54b based on the successive presentation of the media series events "XB11", "XB12", "XB22", "XB23", "XB31", and "XB32" 44.

Hence, the storylines "S1" and "S2" 58 are presented exclusively within the media show 54a, and the storyline "S3" 58 is presented exclusively within the media show 54b. Consequently, if the user 14 decides that he or she is not interested in the storyline "S2" 58, the user 14 can supply user selection preferences to enable storyline filtering in order to disable warnings for any antecedent media content items 32 that do not contain any media series events 44 within the same storyline 58 as contained in the media content item requested by the user. Hence, assuming the user 14 has not consumed the media content item "C6" 32 and the user 14 had enabled storyline filtering to ignore the storyline "S2" 58, the processor circuit 18 can respond to the storyline filtering by ignoring the media content item "C6" 32 that belongs only to the storyline "S2" 58 ignored by the user 14.

The storylines "S4" and "S5" 58 each include media series events 44 from both media shows 54a and 54b. For example, the storyline "S4" 58 represents an example storyline that is presented in both media shows 54a and 54b based on the successive presentation of media series events "XB13", "XB21", "XB23", "XA33", and "XB33" 44. The storyline "S5" 58 represents an example storyline that is presented in both media shows 54a and 54b based on the successive presentation of the media stream events "XA23", "XA33", and "XB33". Hence, the producer of the media series 52 can generate and present the storylines "S4" and "S5" 58 between the two media shows 54a and 54b in order to provide enhanced theme or character development, enabling users who watch both media shows 54a and 54b to enjoy a more enhanced experience than if only one of the media shows was watched. Hence, the processor circuit 18 can identify antecedent media series events from other media shows, enabling the user 14 to be provided an incentive for watching the other media show. For example, if the events "XA33" and "XB33" are presented as previews for the next season of the respective media shows 54a and 54b, users of one media show (e.g., 54a) can be encouraged to begin watching the other media show (e.g., 54b) in order to enhance their experience of watching the final previews for the next season media shows 54a and 54b.

Any of the disclosed circuits of the apparatus 12 (including the device interface circuit 16, the memory circuit 20, the processor circuit 18, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 20) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor circuit. The memory circuit 20 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 20 can be implemented dynamically by the processor circuit 18, for example based on memory address assignment and partitioning executed by the processor circuit 18.

Figure 4A:
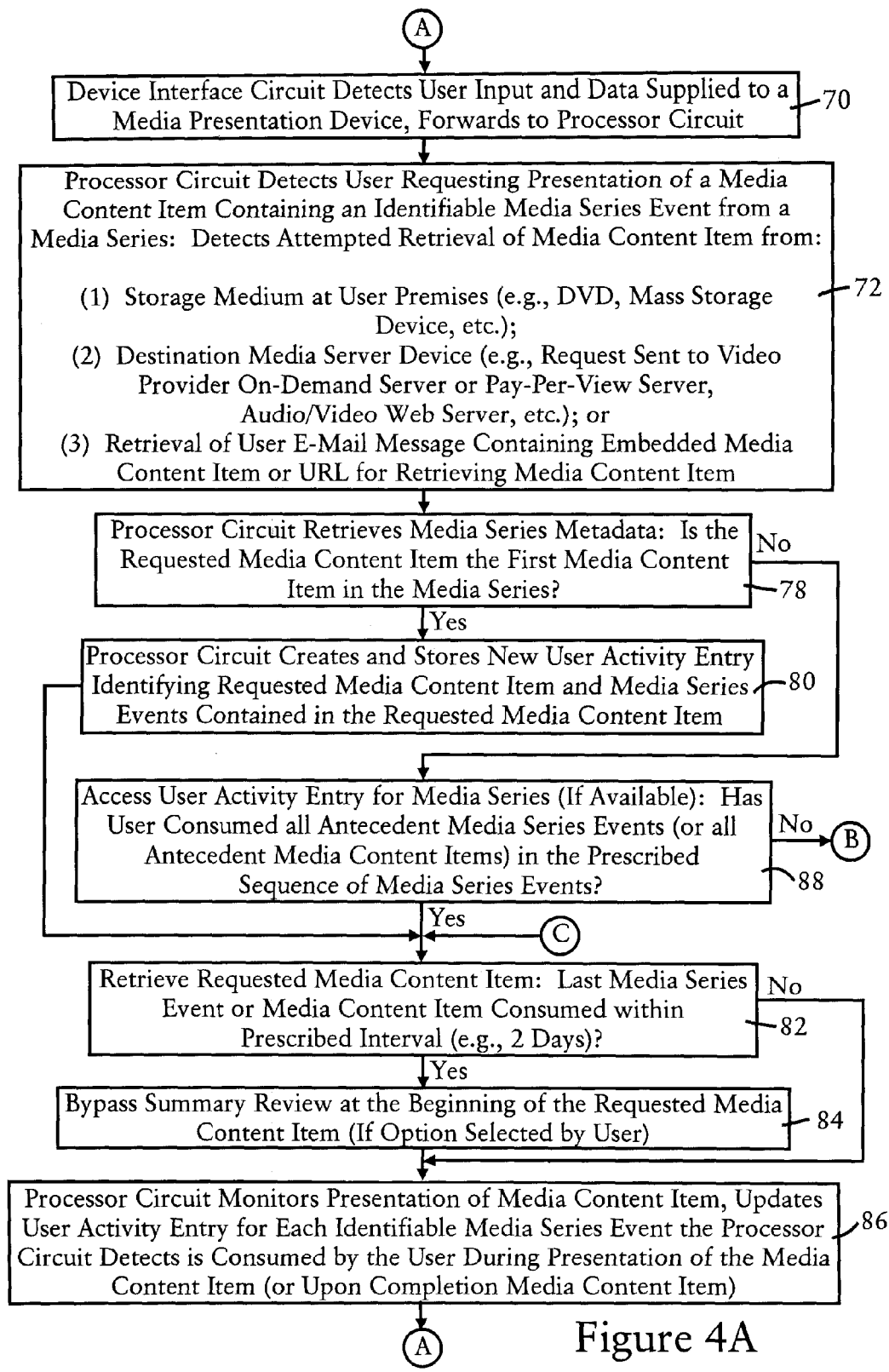
FIGS. 4A and 4B summarize an example method by the apparatus of FIG. 1, according to an example embodiment.
Figure 4B:
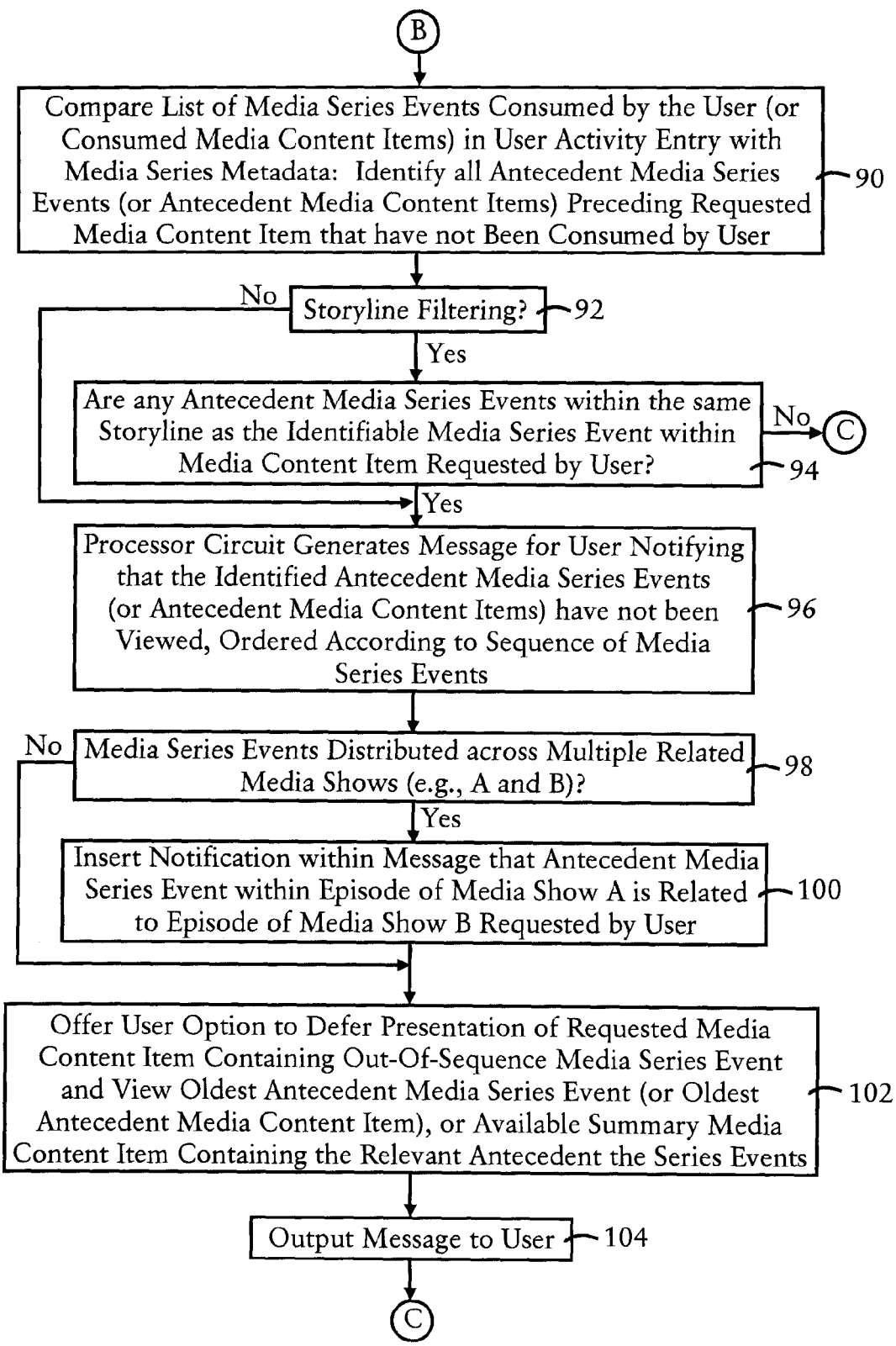

FIGS. 4A and 4B summarize an example method by the apparatus 12 of FIG. 1, according to an example embodiment. The steps described in FIGS. 4A and 4B can be implemented as executable code stored on a computer or machine readable storage medium (e.g., hard disk, ROM, EEPROM, nonvolatile RAM, CD-ROM, etc.) that are completed based on execution of the code by a processor circuit; the steps described herein also can be implemented as executable logic that is encoded in one or more tangible media for execution (e.g., programmable logic arrays or devices, field programmable gate arrays, programmable array logic, application specific integrated circuits, etc.).

The method begins in step 70, where the device interface circuit 16 of the apparatus 12 detects any inputs 24 by the user relating to requesting presentation of a media content item 32. The device interface circuit 16 also detects in step 70 any data supplied to the media presentation device 22 via the data connection 26 related to presentation of a media content item. Hence, the user inputs 24 detected by the device interface circuit 16 enables the processor circuit 18 to detect in step 72 user requests 24 for presentation of a media content item 32 on the media presentation device 22. The detection by the device interface circuit 16 of data supplied to the media presentation device 22 (e.g., video data of the media content item 32 or metadata from the media presentation device 22 describing the media content item 32 retrieved from another video source) enables the processor circuit to monitor in step 86 (bottom of FIG. 4A) the presentation of the media content item 32 to the user 14 (e.g., by media content item identifier 48, media series event identifier 46, or timecode specifying the consumed portion of the media content item 32).

Referring back to step 72, the processor circuit 18 can detect the user has requested presentation of a media content item 32 that contains an identifiable media series event 44 from a media series 52, for example a television series that has been previously recorded by the user, or presented in DVD format. In particular, step 72 illustrates that the processor circuit 18 can be configured for detecting the user 14 has requested presentation of the media content item 32 based on detecting attempted retrieval of the media content item 32 stored on a machine-readable storage medium at a user premises, for example a DVD 74 illustrated in FIG. 1. It should be noted that the data link 76 between the DVD 74 and the apparatus 12 can be implemented in different forms, depending on the implementation of the apparatus 12: if the apparatus 12 is implemented as an intelligent DVD player, the data link 76 can represent a direct link with the DVD 74 as the DVD 74 can be inserted into a portion of the device interface circuit 16; if the apparatus 12 is implemented as a router at the customer premises, the data link 76 can be implemented as a link layer connection between a DVD player (not shown) and the apparatus 12; the data link 76 also can be implemented as a TCP/IP connection between the DVD player (not shown) and the device interface circuit 16, for example if the apparatus 12 is implemented in a service provider network. The DVD 74 can be substituted with another machine-readable storage medium, for example a hard disk drive or a flash memory device.

The processor circuit 18 in step 72 also can detect the user request 24 as a request to a destination media server device 42 for the media content item 32, for example in the case where the apparatus 12 is implemented as either a network device at the user premises (e.g., a Linksys® router), or a network device in a data network (e.g., a network router device or access server device). In this example, the processor circuit 18 can monitor requests and responses between the user 14 and the media server device 42. As described previously and illustrated with respect to step 72, the destination media server device 42 can be implemented as any one of a server device deployed by a video service provider (e.g., an on-demand video server device or pay-per-view server device), a web server device providing audio or video-based media content items 32, etc.

The processor circuit 18 also can detect in step 72 the requested presentation of the media content item 32 in the form of detecting a retrieval by the user 14 of a user message transmitted via a data network (e.g., e-mail message received via POP3 or IMAP, an instant message, etc.) from a messaging server device (e.g., an e-mail server or an instant messaging server). The media content item 32 can either be embedded within the user message, or the user message can contain a reference (e.g., a uniform resource locator (URL)) for retrieval of the media content item 32 from a remote destination via the data network (illustrated as the data connection 38 in FIG. 1).

In response to detecting the requested presentation of the media content item 32, the processor circuit 18 in step 78 retrieves the media series metadata 50, for example from a default location or based on related information within the user request The processor circuit 18 alternately can initiate a search for the media series metadata 50 based on sending a query to the source supplying the media content item 32, or based on submitting a search query using an identifier (e.g., GUID or UPC code) or name of the media content item 32 (e.g, a Google or Yahoo search). The processor circuit 18 alternately can execute a hash, fingerprint, or algorithmic analysis of the content in the media content item 32 and search a central database for the media series metadata. An example of analysis of the content for audio-based media content items can be found at "MusicDNS" on the World Wide Web at the website address "musicip.com/dns/index.jsp".

In response to reviewing the media series metadata 50 (illustrated in FIG. 3), the processor circuit 18 can determine in step 78 whether the requested media content item is the first media content item of the media series ("X") 52, for example based on the media content item identifier 48. Assuming the user request 24 is for the first media content item (e.g., "C1") 32, the processor circuit 18 can create and store in step 80 a user activity entry 34 in a tangible machine-readable data structure 36, either locally within the memory circuit 20 or remotely (e.g., in the media server device 42) via a data connection 38. The processor circuit 18 can retrieve in step 82 the requested media content item (e.g., "C1"): since the requested media content item is the first media content item in the media series "X" 52, the processor circuit 18 can skip step 84 (described below) and begin monitoring in step 86 the presentation of the media content item "C1" 32.

The processor circuit 18 monitors the presentation of the media content item 32 to the user 14 via the media presentation device 22: as described above, the processor circuit 18 can either receive metadata embedded within the media content item "C1" 32 via the device interface circuit 16, either in the form of timecode sequences or explicit references to the media series events 44 as they are presented on the presentation device 22. Hence, the processor circuit 18 can detect that the user 14 has consumed an identifiable media series event (e.g., "XA11", "XA12") 44 as the user consumes the media content item "C1" 32, and in response update the user activity entry 34 indicating that the user has consumed the identifiable media series event, either by explicit reference to the media series event by its identifier 46, or indirectly by reference to the media content item identifier 48. Timecode data also can be stored by the processor circuit 18 in the user activity entry 34 for any partially-consumed media content items 32.

Assume that the user 14 requests the contiguously following media content item "C2" 32 upon completion of the first media content item "C1" (e.g., based on automatic retrieval of all media content items associated with a single episode 60). The processor circuit in step 86 can update the user activity entry indicating the user has consumed the identifiable media series events "XA11", "XA12", and "XA13" 44 either by explicit reference or indirectly based on specifying the media content item identifiers "C1" and "C2" 48. Assume further that the user then consumes the media content items "C3" and "C4" associated with the episode "B1" of the media show 54b, resulting in the processor circuit 18 updating that the user 14 has consumed the identifiable media series events "XB11", "XB12", and "XB13".

Assume that the user 14 next requests the next media content item "C5" 32 in step 72: since the processor circuit 18 determines in step 78 that the requested media content item "C5" is not the first item in the media series 52, the processor circuit 18 accesses in step 88 the user activity entry 34. The processor circuit 18 determines in step 88 that the user has consumed all the prior (i.e., antecedent) media series events (or antecedent media content items) that precede the requested media content item "C5" in the prescribed sequence 64 of media series events. Hence the processor circuit 18 determines in step 84 whether to bypass a summary review at the beginning of the media content item "C5" 32. In particular, producers of multiple-episode television shows often will add a summary review of prior episodes at the beginning of the next episode: while such summary reviews may be helpful for viewers that have not seen the last episode in a relatively long time interval (e.g., a week), such summary reviews can be distracting or annoying for a user that has consumed one or more previous episodes more recently (e.g., within 2 days) because the presented subject matter is still fresh in the user's mind.

Hence, the user 14 can choose an option where the summary review at the beginning of the requested media content item (e.g., "C5") 32 can be bypassed. Hence, the processor circuit 18 in step 84 can bypass the summary review upon initiating presentation of the media content item "C5" 32 in response to determining from the user activity entry 34 that the user 14 has consumed a prescribed number of preceding media series events 44 within a prescribed interval (e.g., 2 days). Although not illustrated in FIG. 5, the user activity entry also can include metadata identifying the date and time that the media series event 44 and/or media content item 32 was consumed by the user 14. The processor circuit 18 can continue to detect that the user has consumed the identifiable media series event "XA21" 44 contained in the media content item "C5" 32, and update the user activity entry 34 accordingly.

Assume that the processor circuit 18 detects the user 14 also consuming the media content item "C6" 32 after the user 14 having consumed the media content item "C5" 32, and that the processor circuit 18 in response updates the user activity entry 34 to indicate that the user 14 has consumed the media content item "C6" 32 and/or the identifiable media series event "XA22" 44 contained in the media content item "C6" 32, resulting in the user activity entry 34 as illustrated in FIG. 5.

If the processor circuit 18 detects in step 72 that the user 14 requests access of the episode "A3" 60 containing the media content items "C10" and "C11" 32, the processor circuit 18 determines in step 88 from the user activity entry 34 that the last media content item 32 consumed by the user 14 is the media content item "C6" 32. The processor circuit 18 also determines in step 88 from the media series metadata 50 (retrieved in step 78) that the user has not consumed all the antecedent media series events in the prescribed sequence 64 of media series events, relative to the requested media content item "C10" 32. In particular, the processor circuit 18 in step 88 of FIG. 4A and step 90 of FIG. 4B compares the list of media series events 44 consumed by the user (or consumed media content items 32) in the user activity entry 34 with the media series metadata 50, and determines that the user 14 has not consumed the antecedent media series event "XA23" 44 contained in the media content item "C7" 32, the antecedent media series events "XB32", "XB22" contained in the media content item "C8" 32, or the antecedent media series event "XB23" 44 contained in the media content item "C9" 32 that precede the first subsequent media series event "XA31" 44 contained in the requested media content item "C10".

Assuming in step 92 of FIG. 4B that storyline filtering is enabled, the processor circuit 18 determines in step 94 whether any of the antecedent media series events in any of the antecedent media content items "C7", "C8", or "C9" 32 are within the same storyline 58 as the identifiable media series event "XA31" or "XA32" 44 contained within the media content item "C10" 32 requested by the user 14. As described previously, the subsequent media series event "XA31" 44 in the requested media content item "A3" shares the same storyline "S5" as the antecedent media series event "XA23" 44 contained in the antecedent media content item "C7" 32. The media series events "XB21", "XB22", and "XB23" contained in the media content items "C8" or "C9"

32 are part of the storylines "S3" and "S4" 58, and therefore share none of the same storylines "S1", "S2", or "S5" presented in the media content item "C10" 32. Hence, if storyline filtering is enabled, then the processor circuit 18 would only offer to present the antecedent media content item "C7" 32 based on determining the antecedent media series event "XA23" and the subsequent media series event "XA31" each are assigned to the same storyline "S5" 58. As illustrated with respect to step 94, if there are no antecedent media series events within the same storyline 58 as the identifiable media series event within the media content item 32 requested by the user 14, the processor circuit 18 can return to retrieve in step 82 of FIG. 4A the requested media content item "C10" 60.

Assume in step 92 that storyline filtering is not enabled. In this case, the processor circuit generates in step 96 a message for the user 14 to notify the user 14 that the identified antecedent media series events "XA23", "XB21", "XB22", and "XB23" 44 and/or the media content items "C7", "C8", and "C9" 32 have not been viewed. The processor circuit 18 also orders the sequence of antecedent media series events (and/or sequence of antecedent media content items) specified in the message according to the prescribed sequence 64 of media series events (or the sequence 62 of media content items consistent with the prescribed sequence 64 of media series events). In addition, since the antecedent media series events 44 identified in the message generated in step 96 are determined in step 98 to be distributed across media shows 54a and 54b, the processor circuit 18 inserts within the message in step 100 a notification. The notification inserted in step 100 specifies that the antecedent media series events "XB21", "XB22", and "XB23" 44 are within the episode "B2" 60 of the media show 54b and are related to the episode "A3" 60 requested by the user 14 for the media show 54a. Hence, the user 14 can be notified of the relationship of the antecedent media content items 32 within the different media shows 54.

The processor circuit 18 also inserts into the message in step 102 a prompt offering the user to defer presentation of the requested media content item "C10" 32 that contains the out of sequence media series event "XA31" 44 relative to the last consumed media series event "XA22". The prompt inserted in step 102 also offers the user 14 an option to view the oldest antecedent media series event "XA23" 44 (or identified by the oldest antecedent media content item "C7" containing the oldest antecedent media series event "XA23").

The option inserted in step 102 also can specify an option to present an available summary media content item that contains the relevant antecedent media series events, enabling the user 14 to view a summary of the prior media content item or episode instead of the entire media content item. The summary media content item can be provided by various sources, for example from a producer of the media show 54, from public user forums or fan sites where users can offer summaries that they have generated using existing video editing tools. Hence, the sources of summary media content items can be determined by the processor circuit 18, for example, based on providing summary metadata in the media series metadata 50; the processor circuit 18 also can be configured for executing a search for the available summary media content item from a publicly available source, for example from the media server device 42 via a wide-area network such as the Internet.

The processor circuit 18 outputs in step 104 the message generated in steps 96, 100 and 102 notifying the user 14 that the user 14 has not consumed all the antecedent media series events. The notification enables the user 14 to defer presentation of the media content items "C 10" and "C11" containing the media series events "XA31", "XA32", and "XA33" for episode "A3"; the notification also enables the user to consume the antecedent media series events "XA23", "XB21", "XB22", and "XB23" according to the prescribed sequence 64 of events for the media series "X" 52.

According to example embodiments, users can be notified of missing media series events in order to prevent the user from inadvertently viewing out of sequence media series events, also referred to as "spoilers". In addition, the example embodiments provide enhanced flexibility and viewing options based on user preferences, including bypassing the relevant or undesirable storylines, viewing a summary of a prior episode instead of the complete prior episode, bypassing summary reviews been considered undesirable by a user, etc. Hence, the example embodiments ensure users can enjoy a richer experience of the media series events as originally intended by the media series producer, even if all the media content items are already available.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting that a user has requested presentation of a media content item from a media series having a prescribed sequence of media series events that are identifiable by respective media series event identifiers, the media content item containing a subset of the prescribed sequence of media series events including a subsequent media series event from the media series and the respective media series event identifiers embedded as media series metadata, the subsequent media series event part of an identified storyline;
   determining that the user has not consumed an antecedent media series event that is identified by the corresponding media series event identifier, the antecedent media series event not in the media content item and preceding the subsequent media series event in the prescribed sequence of media series events; and
   selectively sending a message notifying the user that the user has not consumed at least the antecedent media series event based on a storyline filtering determining the antecedent media series event is part of the identified storyline, or the antecedent media series event selectively ignored based on the storyline filtering determining the antecedent media series event is not part of the identified storyline;
   the message enabling the user to defer presentation of the media content item containing the subsequent media series event and consume the antecedent media series event in the identified storyline according to the prescribed sequence of media series events.

2. The method of claim 1, wherein:
   the media series has a prescribed sequence of episodes for presentation of the prescribed sequence of media series events, the antecedent media series event presented within a first of the episodes, and the subsequent media series event presented within a second of the episodes that follows the first of the episodes according to the prescribed sequence of episodes;
   the sending including inserting into the message a prompt offering the user to consume one of the first episode or a summary media content item that contains the antecedent media series event.

3. The method of claim 2, wherein:
the media series further includes a first media show and a second media show, the prescribed sequence of episodes including a first prescribed sequence of episodes for the first media show and a second prescribed sequence of episodes for the second media show, the prescribed sequence of media series events interleaved within the first prescribed sequence of episodes and the second prescribed sequence of episodes;
the second episode is one of the episodes for the first media show and the first episode is one of the episodes for the second media show; and
the sending including inserting into the message a notification that the antecedent media series event within the second media show is related to the second episode of the first media show.

4. The method of claim 3, wherein the media series includes a plurality of storylines, each media series event assigned to at least one of the storylines, the sending of the message based on the determining the antecedent media series event and the subsequent media series event each are assigned to the same storyline.

5. The method of claim 1, wherein the media series includes a plurality of storylines, each media series event assigned to at least one of the storylines, the sending of the message based on the determining the antecedent media series event and the subsequent media series event each are assigned to the same storyline.

6. The method of claim 1, wherein the detecting that the user has requested presentation of the media content item is based on at least one of:
detecting an attempted retrieval by the user of the media content item stored on a machine-readable storage medium at a user premises of the user;
detecting a request by the user to a destination media server device for the media content item containing the subsequent media series event; or
detecting a retrieval by the user of a user message having been transmitted via a data network, the user message containing at least one of the media content item embedded within the user message, or a reference enabling retrieval of the media content item from a remote destination via the data network.

7. The method of claim 1, further comprising:
detecting that the user has consumed an identifiable media series event from the media series, and in response storing on a tangible machine-readable data structure a user activity entry indicating that the user has consumed the identifiable media series event, wherein the antecedent media series event follows the identifiable media series event in the prescribed sequence of media series events;
retrieving a second media content item containing the antecedent media series event in response to detecting the user has requested presentation of the antecedent media series event following the user having consumed the identifiable media series event, the second media content item containing a summary review containing the identifiable media series event and preceding the antecedent media series event; and
selectively bypassing the summary review, upon initiating presentation of the second media content item, based on determining from the tangible machine-readable data structure that the user has consumed the identifiable media series event within a prescribed time interval.

8. The method of claim 1, wherein the determining includes identifying the antecedent media series event from the media series metadata, the media series metadata identifying the prescribed sequence of media series events and media content items, each media content item containing one or more of the media series events arranged in a contiguous sequence, the media series metadata identifying the one or more of the media series events contained in each media content item.

9. The method of claim 8, wherein the determining further includes identifying a plurality of the antecedent media series events that precede the subsequent media series event and that have not been consumed by the user, the message identifying a sequence of the media content items containing the antecedent media series events according to the prescribed sequence of media series events.

10. An apparatus comprising:
a device interface circuit configured for detecting inputs by a user and data supplied to a media presentation device in use by the user; and
a processor circuit configured for:
detecting, via the device interface circuit, that the user has requested presentation of a media content item from a media series having a prescribed sequence of media series events that are identifiable by respective media series event identifiers, the media content item containing a subset of the prescribed sequence of media series events including a subsequent media series event from the media series and the respective media series event identifiers embedded as media series metadata, the subsequent media series event part of an identified storyline,
determining that the user has not consumed an antecedent media series event that is identified by the corresponding media series event identifier, the antecedent media series event not in the media content item and preceding the subsequent media series event in the prescribed sequence of media series events, and
selectively sending, via the device interface circuit, a message notifying the user that the user has not consumed at least the antecedent media series event based on a storyline filtering determining the antecedent media series event is part of the identified storyline, or the antecedent media series event selectively ignored based on the storyline filtering determining the antecedent media series event is not part of the identified storyline;
the message enabling the user to defer presentation of the media content item containing the subsequent media series event and consume the antecedent media series event in the identified storyline according to the prescribed sequence of media series events.

11. The apparatus of claim 10, wherein:
the media series has a prescribed sequence of episodes for presentation of the prescribed sequence of media series events, the antecedent media series event presented within a first of the episodes, and the subsequent media series event presented within a second of the episodes that follows the first of the episodes according to the prescribed sequence of episodes;
the processor circuit configured for inserting into the message a prompt offering the user to consume one of the first episode or a summary media content item that contains the antecedent media series event.

12. The apparatus of claim 11, wherein:
the media series further includes a first media show and a second media show, the prescribed sequence of episodes including a first prescribed sequence of episodes for the first media show and a second prescribed sequence of episodes for the second media show, the prescribed sequence of media series events interleaved within the first prescribed sequence of episodes and the second prescribed sequence of episodes;

the second episode is one of the episodes for the first media show and the first episode is one of the episodes for the second media show; and the processor circuit configured for inserting into the message a notification that the antecedent media series event within the second media show is related to the second episode of the first media show.

13. The apparatus of claim 12, wherein the media series includes a plurality of storylines, each media series event assigned to at least one of the storylines, the processor circuit configured for generating the message based on the processor circuit determining the antecedent media series event and the subsequent media series event each are assigned to the same storyline.

14. The apparatus of claim 10, wherein the media series includes a plurality of storylines, each media series event assigned to at least one of the storylines, the processor circuit configured for generating the message based on the processor circuit determining the antecedent media series event and the subsequent media series event each are assigned to the same storyline.

15. The apparatus of claim 10, wherein the processor circuit configured for detecting that the user has requested presentation of the media content item is based on at least one of:

the processor circuit detecting an attempted retrieval by the user of the media content item stored on a machine-readable storage medium at a user premises of the user;

the processor circuit detecting a request by the user to a destination media server device for the media content item containing the subsequent media series event; or the processor circuit detecting a retrieval by the user of a user message having been transmitted via a data network, the user message containing at least one of the media content item embedded within the user message, or a reference enabling retrieval of the media content item from a remote destination via the data network.

16. The apparatus of claim 10, wherein the processor circuit further is configured for:

detecting that the user has consumed an identifiable media series event from the media series, and in response storing on a tangible machine-readable data structure a user activity entry indicating that the user has consumed the identifiable media series event, wherein the antecedent media series event follows the identifiable media series event in the prescribed sequence of media series events;

retrieving a second media content item containing the antecedent media series event in response to detecting the user has requested presentation of the antecedent media series event following the user having consumed the identifiable media series event, the second media content item containing a summary review containing the identifiable media series event and preceding the antecedent media series event; and selectively bypassing the summary review, upon initiating presentation of the second media content item, based on determining from the tangible machine-readable data structure that the user has consumed the identifiable media series event within a prescribed time interval.

17. The apparatus of claim 10, wherein the processor circuit configured for identifying the antecedent media series event from the media series metadata, the media series metadata identifying the prescribed sequence of media series events and media content items, each media content item containing one or more of the media series events arranged in a contiguous sequence, the media series metadata identifying the one or more of the media series events contained in each media content item.

18. The apparatus of claim 17, wherein the processor circuit configured for identifying a plurality of the antecedent media series events that precede the subsequent media series event and that have not been consumed by the user, the processor circuit configured for identifying within the message a sequence of the media content items containing the antecedent media series events according to the prescribed sequence of media series events.

19. Logic encoded in one or more non-transitory tangible media for execution and when executed operable for:

detecting that a user has requested presentation of a media content item from a media series having a prescribed sequence of media series events that are identifiable by respective media series event identifiers, the media content item containing a subset of the prescribed sequence of media series events including a subsequent media series event from the media series and the respective media series event identifiers embedded as media series metadata, the subsequent media series event part of an identified storyline;

determining that the user has not consumed an antecedent media series event that is identified by the corresponding media series event identifier, the antecedent media series event not in the media content item and preceding the subsequent media series event in the prescribed sequence of media series events; and selectively sending a message notifying the user that the user has not consumed at least the antecedent media series event based on a storyline filtering determining the antecedent media series event is part of the identified storyline, or the antecedent media series event selectively ignored based on the storyline filtering determining the antecedent media series event is not part of the identified storyline;

the message enabling the user to defer presentation of the media content item containing the subsequent media series event and consume the antecedent media series event in the identified storyline according to the prescribed sequence of media series events.

20. An apparatus comprising:

a device interface circuit configured for detecting inputs by a user and data supplied to a media presentation device in use by the user; and means for detecting, via the device interface circuit, that the user has requested presentation of a media content item from a media series having a prescribed sequence of media series events that are identifiable by respective media series event identifiers, the media content item containing a subset of the prescribed sequence of media series events including a subsequent media series event from the media series and the respective media series event identifiers embedded as media series metadata, the subsequent media series event part of an identified storyline, the means for detecting further configured for:

determining that the user has not consumed an antecedent media series event that is identified by the corresponding media series event identifier, the antecedent media series event not in the media content item and preceding the subsequent media series event in the prescribed sequence of media series events, and selectively sending, via the device interface circuit, a message notifying the user that the user has not consumed at least the antecedent media series event based on a storyline filtering determining the antecedent media series event is part of the identified storyline, or the antecedent media series event selectively ignored based on the storyline filtering determining the antecedent media series event is not part of the identified storyline;

the message enabling the user to defer presentation of the media content item containing the subsequent media series event and consume the antecedent media series event in the identified storyline according to the prescribed sequence of media series events.

* * * * *